United States Patent [19]
Nakajima

[11] 3,897,259
[45] July 29, 1975

[54] PROCESS FOR MANUFACTURING INCOMBUSTIBLES

[76] Inventor: Shiro Nakajima, Aza-Rokutanda, Aichi-Ken, Japan

[22] Filed: Oct. 24, 1973

[21] Appl. No.: 409,299

[52] U.S. Cl. .................. 106/85; 106/105; 106/118; 106/119
[51] Int. Cl.² ......................................... C04B 11/00
[58] Field of Search ............. 106/85, 105, 118, 119, 106/288 B, DIG. 1, 109

[56] References Cited
UNITED STATES PATENTS

| | | | |
|---|---|---|---|
| 3,642,445 | 2/1972 | Muter et al. | 106/288 B |
| 3,785,840 | 1/1974 | Minnick et al. | 106/118 |

*Primary Examiner*—J. Poer
*Attorney, Agent, or Firm*—Waters, Schwartz & Nissen

[57] ABSTRACT

A process for manufacturing plaster boards from calcium sulfite hydrate by-products from a smoke-discharging desulfurizer using lime. The calcium sulfite hydrate is mixed with neutral magnesium carbonate so as to prevent sulfurous acid gas from discharging from the smoke-discharging type desulfurizer and to settle the problem of public pollution.

3 Claims, No Drawings

PROCESS FOR MANUFACTURING INCOMBUSTIBLES

FIELD OF THE INVENTION

This invention relates to a process for manufacturing incombustibles and more particularly to a process for manufacturing incombustibles such as plaster boards from calcium sulfite hydrate byproducts from the method of desulfurizing smoke using lime.

DESCRIPTION OF THE PRIOR ART

Nowadays, the calcium sulfite hydrate by-products of the method of desulfurizing smoke using lime powder have been employed to make gypsum boards by the steps of purifying for removing impurities, oxidizing the calcium sulfite in order to chemically make calcium sulfate, and calcining the calcium sulfate. The resultant calcined calcium sulfate has been generally used as raw materials for gypsum boards. Otherwise, the calcium sulfite has been discarded.

However, when the calcium sulfite hydrate by-product from the method of desulfurizing smoke using lime powder is used as a raw material for gypsum boards of buildings, it is necessary for producing the gypsum boards to take or carry out the steps of purifying, oxidation and calcination. Accordingly, the producing process is very complicated or troublesome and needs to employ a large apparatus. Also, the cost for carrying out the above smoke desulfurizing process is disadvantageously increased. If the calcium sulfite hydrate by-products are discarded, naturally the fear of public pollution arises.

Consequently, as is well known in the art, while the above method of desulfurizing smoke functions effectively, the process has not been used widely, because there is no way to profitably use the by-products as well as effectively settle the problem of public pollution.

SUMMARY OF THE INVENTION

Stated broadly, the present invention is directed to the production of incombustibles or the process for producing incombustibles such as plaster boards from the calcium sulfite hydrate by-products from the method of desulfurizing smoke using lime.

The process of the invention when used in incombustibles production yields a by-products of calcium sulfite hydrate which is profitably used as raw materials of plaster boards in order to settle the problem of public pollution.

It is accordingly a general object of this invention to provide a new and improved process for producing incombustibles and solving the problem of public pollution.

Other and more particular objects are to provide a new and improved process for manufacturing incombustibles having the characteristics of higher strength, lighter and lower cost than conventional gypsum boards.

Another object of this invention is to provide a useful and efficient process for manufacturing incombustibles such as plaster boards from the calcium sulfite hydrate by-product from the method of desulfurizing smoke using lime.

Still another object of the invention is to provide an effective and economical process for manufacturing plaster boards from the calcium sulfite hydrate by-products from the method of desulfurizing smoke in order to solve the problem of public pollution due to the discarding of the by-products.

Still another and more particular object is to provide an improved product of incombustibles and a process for manufacturing the same which process comprises the steps of mixing the calcium sulfite hydrate by-products from the method of desulfurizing smoke using lime with neutral magnesium carbonate, and fibrous materials of organic and inorganic fibers and water in order to produce an aqueous suspension, forming a wet mat from the suspension in order to make formed members, heating the formed members to harden them, and finally drying the formed members.

The manner in which the foregoing and other objects are achieved in accordance with the present invention will be better understood in view of the following detailed description which forms a part of the specification.

DESCRIPTION OF PREFERRED EMBODIMENT

The invention will be further illustrated by the following example which sets forth the particularly advantageous process and incombustibles manufactured by said process.

In accordance with the example, 40 wt% of calcium sulfite hydrate by-produced in the method of desulfurizing smoke using lime is mixed as is with an aqueous suspension of magnesium hydroxide, the mixed aqueous suspension is blown with a combustion gas produced by a smoke-discharging desulfurizing process, whereby the magnesium hydroxide contained in the suspension absorbs carbon dioxide gas to produce 40 wt% of neutral magnesium carbonate. In the next steps, 40 wt% of the neutral magnesium carbonate and 20 wt% of inorganic fibrous materials such as asbestine fiber or organic fibrous materials such as wood pulp or mixed fibrous material of both inorganic and organic materials afore-mentioned are mixed, the mixed suspension is ladled with a ladling machine in order to partially dehydrate the suspension and form a wet mat, the partially dehydrated material is pressed by means of a press in order to further dehydrate the material to make sheet-like articles, the sheets are piled up and they are charged into a hardening machine thermally controlled at 85° – 95°C in order to heat and harden, and finally the hardened sheets are dried in a dryer thermally adjusted at about 130°C, thus producing incombustible products.

The products obtained in the example or embodiment described above have large crystals of calcium sulfite hydrate having a high mechanical strength, and between the crystals particles of neutral magnesium carbonate are inserted so as to twine together. The crystals of calcium sulfite hydrate and the particles of neutral magnesium carbonate thus twined together are heated and hardened, so that the strength of the board is extremely increased. The bending strength of the products manufactured according to the present invention corresponds to that of magnesium carbonate boards.

The following table shows the comparison of the board of the present invention and the gypsum boards of the prior art.

| | products of this invention | plaster boards of prior art |
|---|---|---|
| Bending strength, dry (kg/cm2) | 117 | 60 |
| Bending strength, wet (kg/cm2) | 84 | 11 |
| Bulk specific gravity | 0.75 | 0.90 |
| Size variation, soak in water | 0.2% | 1% |
| Size variation, water sprinkling | 0.2% | 0.5% |

As apparent from the table, the bending strength of incombustible products boards according to the present invention is increased by 1.5 times as compared with the gypsum boards of the prior art and the bending strength of the improved boards of this invention is not decreased as much when they are wetted in comparison with the gypsum boards of the prior art. Also, the difference between the size variations when soaked in water and sprinkled with water of the incombustible products of this invention are very small in comparison with the plaster boards of the prior art. The fire-proof test according to the Construction Standard proved that the incombustible boards of the present invention are comparable with the conventional gypsum boards at half the thickness.

At this point it may be noted and as is generally known in the art, calcined calcium sulfate used in the conventional gypsum boards as the hardening material has been produced by the step of calcining the calcium sulfate or as stated above the steps of purifying, oxidizing and calcining calcium sulfite by-produced in the method of desulfurizing smoke using lime powder. On the contrary, in accordance with the present invention, the calcium sulfite by-produced in the method of desulfurizing smoke is hardened by mixing with neutral magnesium carbonate without the steps of purifying, oxidizing and calcining the calcium sulfite in order to directly use it as a raw material for producing the incombustible board. Thus the cost for producing the incombustibles such as plaster boards according to this invention is advantageously not higher than that of the conventional gypsum boards. Furthermore, the incombustible products of the present invention use calcium sulfite by-products which would be discarded and to be mixed just as is, so that the incombustibles have a strength which comparable to that of the conventional magnesium carbonate board and at the same time the manufacturing cost of the incombustibles advantageously is considerably lowered.

The most important aspect of the present invention resides in the solution to a problem of public pollution. According to the aspect of the present invention, the calcium sulfite by-product of the gas-discharging desulfurizer is mixed with neutral magnesium carbonate, thereby the sulfurous acid gas contained in the discharging gas is considerably decreased.

As is generally known in the prior art, the incombustibles such as plaster boards manufactured by the process of the present invention are used advantageously for interior finish work as well as incombustibles for building.

While the mixing ratio of individual materials of lime sulfite, neutral magnesium carbonate and fibrous material was described as an example, their weight percentage will be determined freely according to the desired requirements of the incombustibles such as strength and bulk specific gravity.

Preferably, the weight per cent of fibrous material will be determined as 15 – 20 wt%, neutral magnesium carbonate as 30 – 55 wt% taking into consideration their cost including lime sulfite.

Although a specific preferred embodiment of the present invention has been described in the detailed description above, the description is not intended to limit the invention to the particular forms or embodiments disclosed herein, since they are to be recognized as illustrative rather than restrictive. The invention is declared to cover all changes and modifications of the specific example of the invention herein disclosed for purposes of illustration, which do not constitute departures from the spirit and scope of the invention.

What is claimed is:

1. A process for manufacturing incombustibles, comprising the steps of mixing 55–25 weight % of calcium sulfite hydrate in the form of the aqueous suspension by-product from a smoke-discharging type desulfurizer using lime, with 30–55 weight % of neutral magnesium carbonate and 15–20 weight % of fibrous material, partially dehydrating the suspension by forming a wet mat of the suspension in order to make a formed sheet-like member, heating the formed member at a temperature of 85–95°C. to harden it, and finally drying the formed member.

2. The formed member produced by the process of claim 1.

3. A process for manufacturing incombustibles comprising the steps of mixing 55–25 weight % of calcium sulfite hydrate in the form of the by-product from a smoke-discharging type desulfurizer using lime, and a magnesium hydroxide suspension in an amount equivalent to 30–55 weight % of neutral magnesium carbonate, blowing in a carbon dioxide-containing gas to form said amount of magnesium carbonate in situ, adding 15–20 weight % of fibrous material to the aqueous suspension, partially dehydrating and forming a wet mat of the suspension in order to make a formed member, heating the formed member at a temperature of 85°–95°C. to harden it and finally drying the formed member.

* * * * *